(12) United States Patent
Pagano et al.

(10) Patent No.: US 6,222,999 B1
(45) Date of Patent: Apr. 24, 2001

(54) LATCHED FILM UNIT, LATCHING DEVICE, SYSTEM, AND METHOD

(75) Inventors: Daniel M. Pagano, Honeoye Falls; Christopher T. Mattson, Spencerport, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/219,013

(22) Filed: Dec. 23, 1998

(51) Int. Cl.[7] ............... G03B 7/24; G03B 17/24

(52) U.S. Cl. .......... 396/208; 396/319; 396/321; 396/512

(58) Field of Search ............... 369/52; 396/208, 396/512, 515, 310, 312, 319, 321

(56) References Cited

U.S. PATENT DOCUMENTS

| | | |
|---|---|---|
| 4,300,822 | 11/1981 | Powers . |
| 4,960,994 | * 10/1990 | Muller et al. . |
| 5,218,502 | * 6/1993 | Tanaka et al. . |
| 5,394,206 | * 2/1995 | Cocca ................................ 396/208 |
| 5,524,231 | * 6/1996 | Brown . |
| 5,552,849 | * 9/1996 | DiRisio et al. ................... 396/515 |
| 5,816,838 | * 10/1998 | Del Prete et al. . |
| 5,897,230 | 4/1999 | Pagano et al. . |
| 5,929,974 | * 7/1999 | Inuiya ............................... 396/208 |

* cited by examiner

Primary Examiner—David M. Gray
(74) Attorney, Agent, or Firm—Robert Luke Walker (57) ABSTRACT

A latched film unit has a support, a filmstrip held by the support, and a latch mounted to the support. The latch is reversibly switchable between a first state and a second state and can enable or disable an access right of a memory element in the film unit. A latching device operates the film unit.

31 Claims, 8 Drawing Sheets

LATCHED FILM UNIT, LATCHING DEVICE, SYSTEM, AND METHOD

FIELD OF THE INVENTION

The invention relates to photography and more particularly relates to a latched film unit, a latching device, a system, and a method.

BACKGROUND OF THE INVENTION

In film photography, film is exposed by a consumer and then, generally submitted to a photofinisher for processing. Communication between the consumer and photofinisher is limited and is usually in the form of instructions written on a photofinishing envelope. Instructions are sometimes written or taped or otherwise recorded on the film cassette. There are risks that instructions will be ambiguous, or unreadable, or misplaced, or will be erroneously erased or ignored.

It would thus be desirable to provide an improved film unit, devices, methods, and systems in which the state of one or more predetermined functions can be easily and unambiguously communicated.

SUMMARY OF THE INVENTION

The invention is defined by the claims. The invention, in its broader aspects, provides a latched film unit, latching device, system, and method. The latched film unit has a support, a filmstrip held by the support, and a latch mounted to the support. The latch is reversibly switchable between a first state and a second state and can enable or disable an access right of a memory element in the film unit. A latching device operates the film unit.

It is an advantageous effect of at least some of the embodiments of the invention that latched film units, latching devices, methods and systems are provided in which the state of one or more predetermined functions can be easily and unambiguously communicated.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
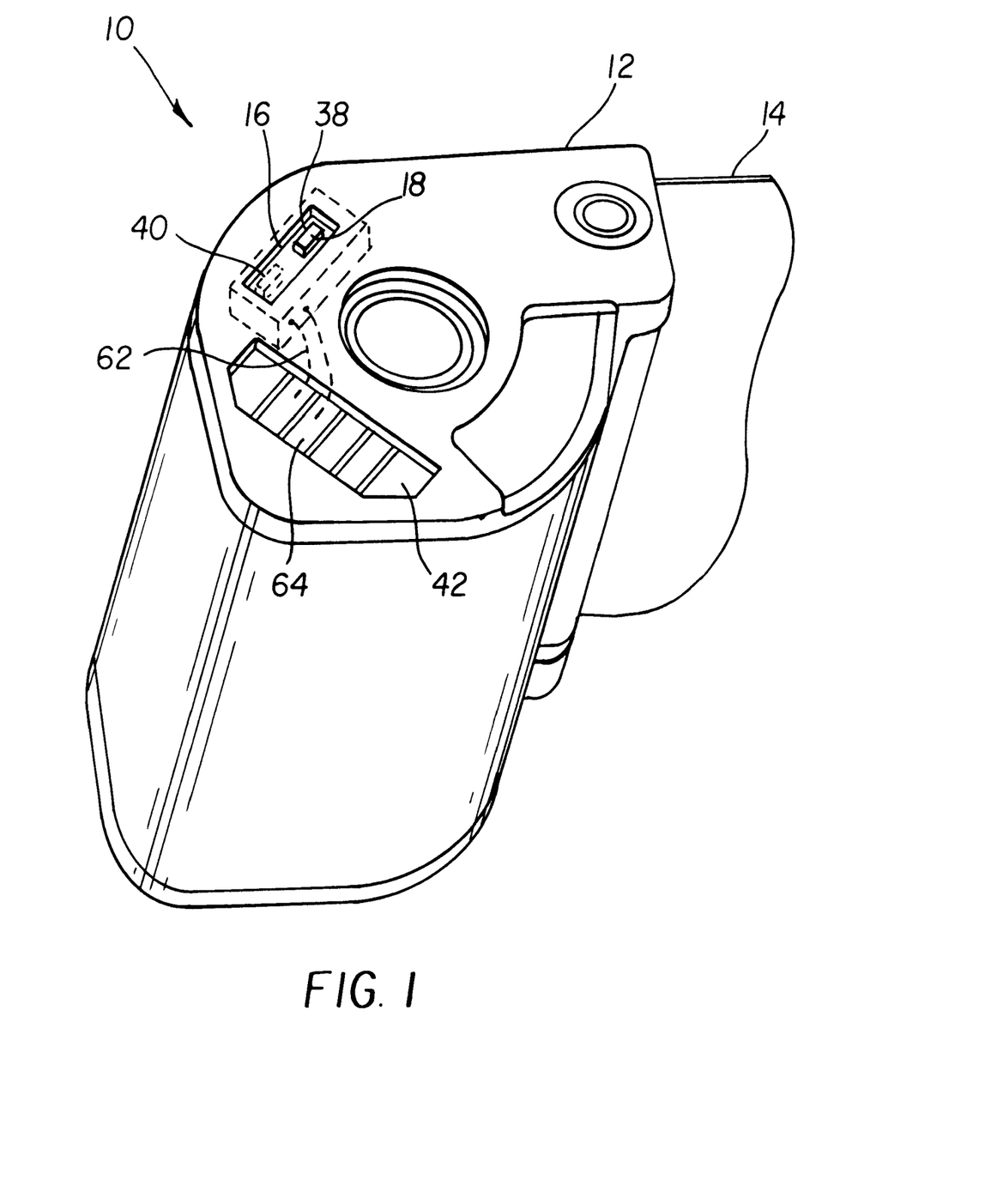
FIG. 1 is a perspective view of an embodiment of the latched film unit.
Figure 8:
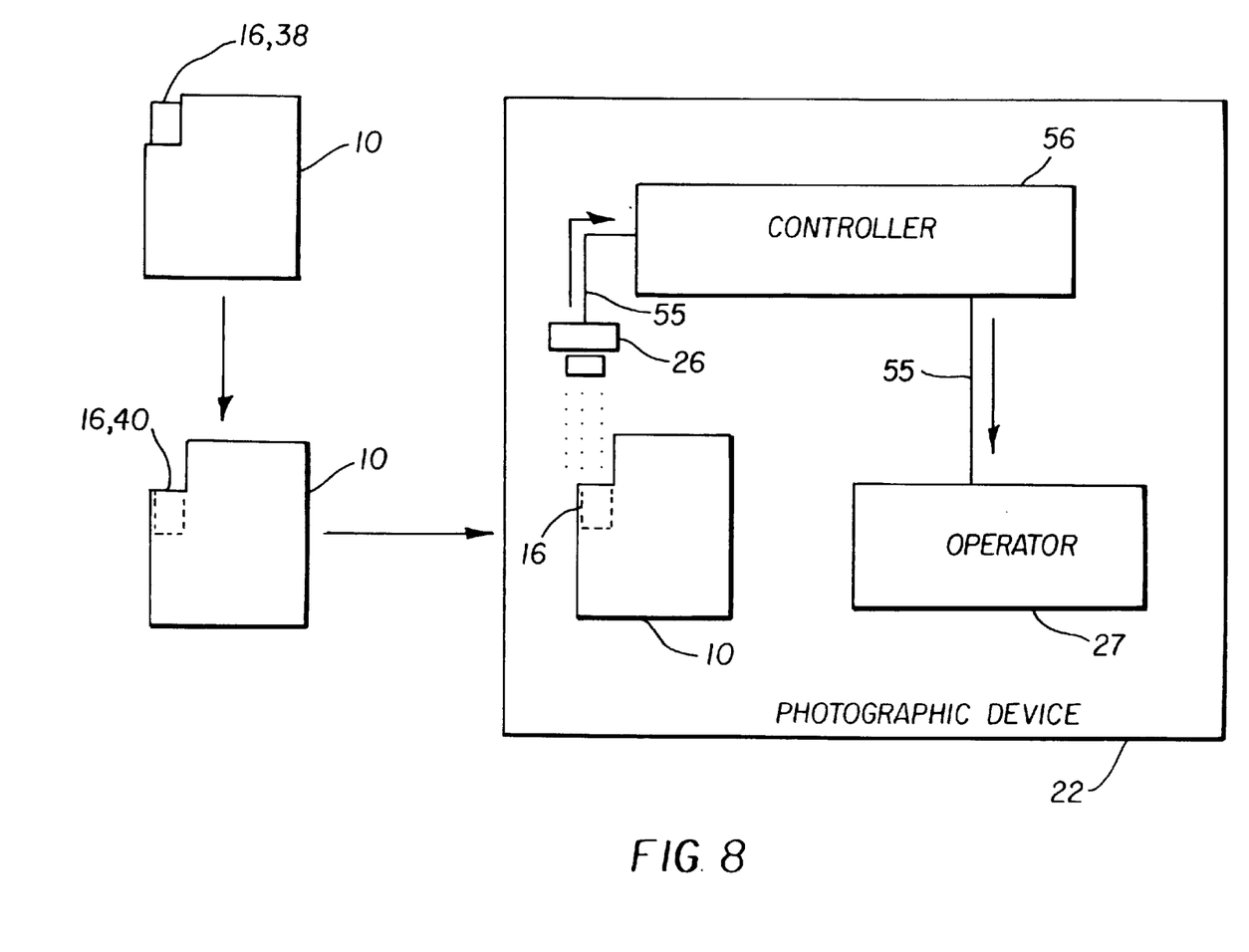
FIG. 8 is a diagram of the method of the invention.

Referring to FIG. 1, the latched film unit 10 has a support 12 that holds a photographic filmstrip 14 which stores or can store captured images. A latch 16 is mounted to the support 12. The latch 16 is reversibly switchable between an unset state 38 and a set state 40. Referring to FIG. 8, the latch 16 is set and is then used in a photographic device 22 to selectively control a photographic function provided by an operator 27 that receives or is signaled by the film unit 10, via a controller 56. The operator changed by the controller 56 can be physical or logical and can encompass almost any function of photofinishing or other film usage. For example, the latch 16 can signal photofinishing equipment or a human operator to look to special instructions provided on a processing envelope or other data source. The latch 16 can provide control actively by directly disabling or enabling a film unit function or transmitting an electrical or optical signal to the photographic device 22. The latch 16 can alternatively provide control passively by simply changing state in a way that can be sensed by a detector 26.

Figure 5:
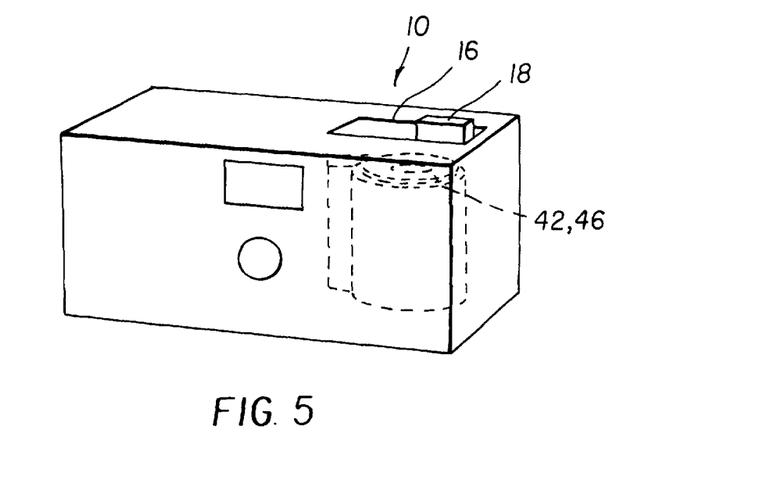
FIG. 5 is a perspective view of one-time use camera that is another embodiment of the latched film unit.

The size and other characteristics of the filmstrip 14 are not critical. The support 12 can have any of a variety of shapes compatible with the filmstrip 14, such as those used in past film cartridges and other film units. For example, the support 12 can be a single chamber cartridge, as in a Type 135 or APS™ film, or a multiple chamber cartridge as in Type 110 film. The support 12 can be a light-tight case or enclosure as in the film types just indicated or a non-light-tight case or a simpler holder such as a spool. The support 12 can include features necessary to provide a one-time use camera 28, as shown in FIG. 5. The support can imitate the shape of earlier film cartridges to provide backward compatibility with earlier cameras and equipment, within the limits of available features.

Figure 6:
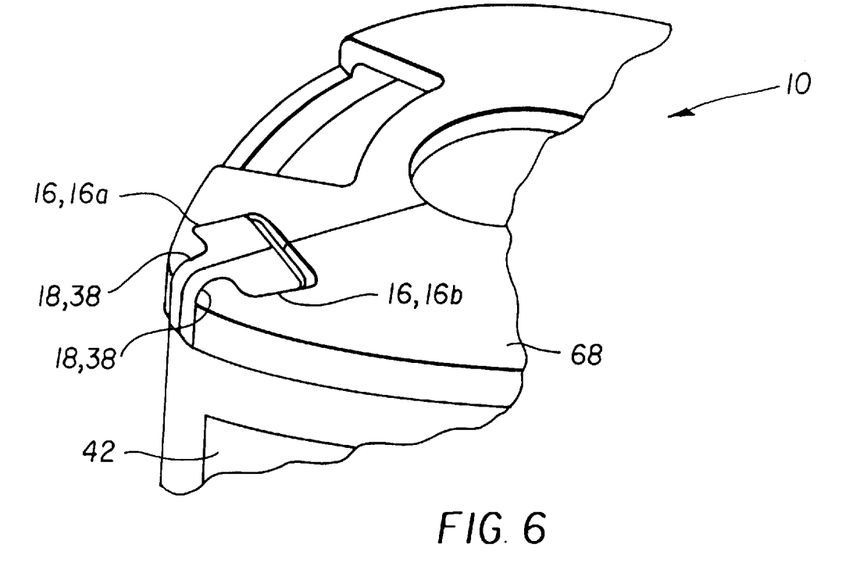
FIG. 6 is a partial perspective view of another embodiment of the latched film unit. First and second latches are each in an unset position.
Figure 7:
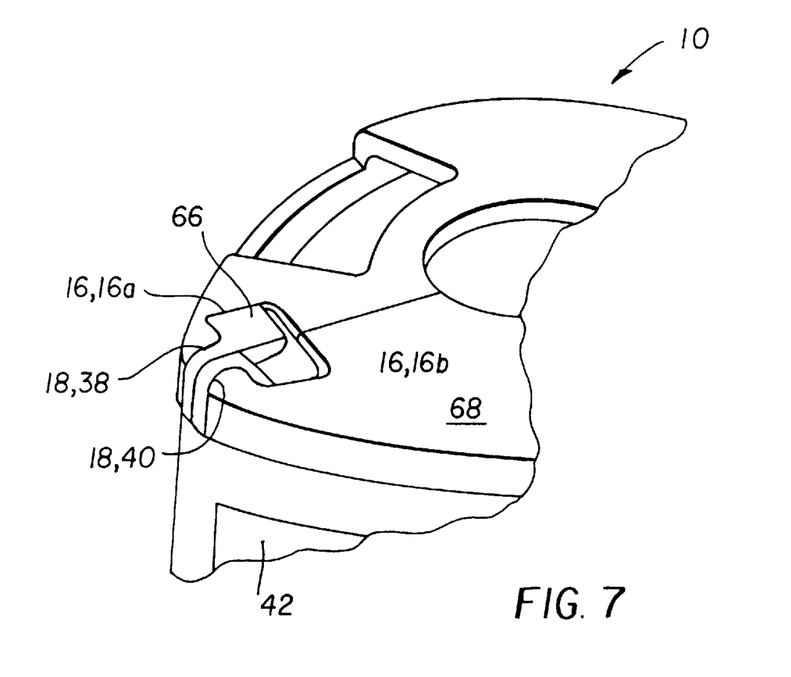
FIG. 7 is the same view as FIG. 6. The first latch is in the unset position. The second latch is in the set position.
Figure 10:
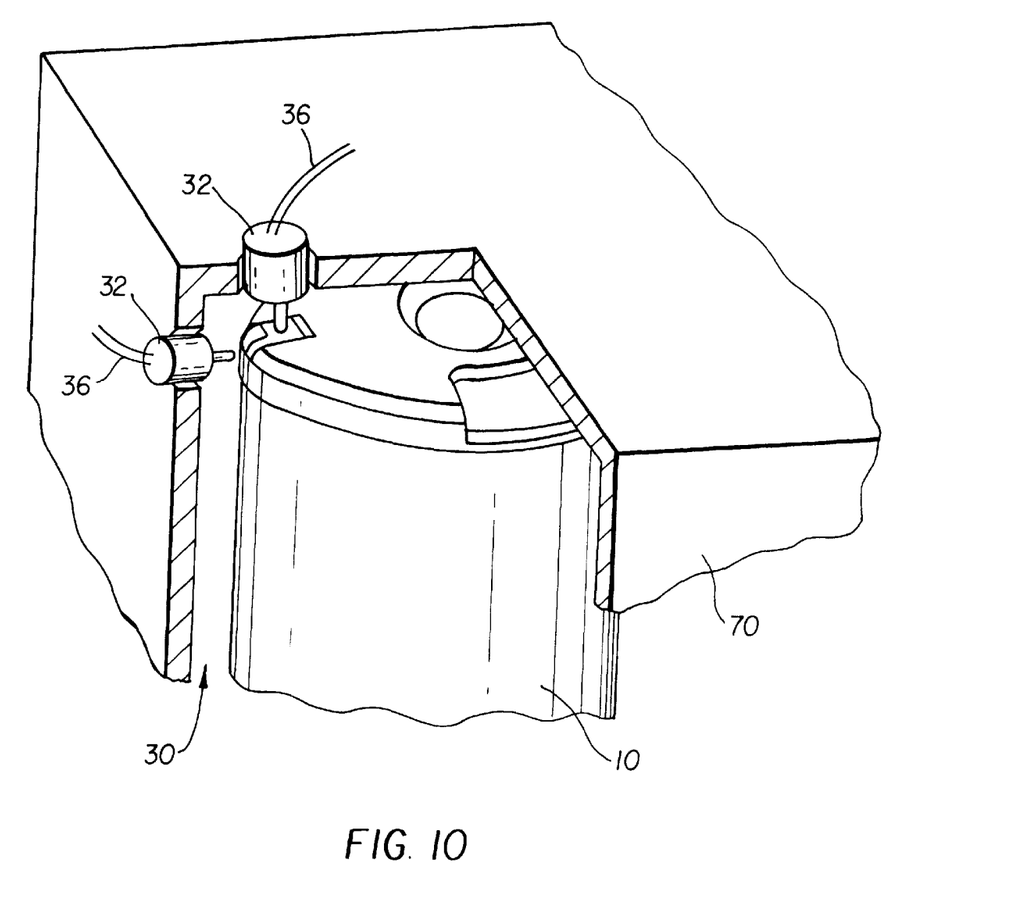
FIG. 10 is a partial, cut-away perspective view of an embodiment of the latching device. A latched film unit is present in the cassette station. The latching device and latched film unit constitute the system of the invention.

The latch 16 is a switch or toggle that can be reversibly moved or altered between two or more states. The latch 16 is preferably a mechanical device, in which an actuator 18 is translated or rotated or otherwise moved relative to a non-moving base 20 that is fixed to or part of the support 12. Latches 16 shown in FIGS. 1–3 and 5 slides between states. The latch shown in FIG. 4 pivots between states. The actuator 18 is stable in each of its states. The state of the latch 16 is machine-readable and, preferably, also perceptible by human vision, from the outside of the support 12. In particular embodiments, the state is also tactilely perceptible. It is highly preferred that the latch 16 is switchable either manually or using a simple implement such as a bent paper clip or pencil point. A film unit 10 can have multiple latches 16, as shown in FIGS. 6–7. FIG. 10 illustrates a latching mechanism including as part of a photographic device 22 such as a camera. The device has a cassette station 30 that receives the latched film unit 10 in a predetermined position. Detectors 32 are positioned adjoining the latch 16. The detectors 32 include solenoids and are driven through signal lines 36 from a controller (not shown in FIG. 10) to move against or away from the actuator 18 of the latch 16. The detectors 32 are used in alternation to pivot the latch 16 between set and unset positions. The latch 16 shown in FIG. 10 is also manually switchable.

FIG. 8 illustrates the use of a film unit 10 in which the latch 16 functions passively. The latch 16 is moved from the unset state 38 to the set state 40. The latch 16 can be limited to a simple actuator 18 and a support 12 that retains the actuator 18 and allows movement between positions providing the different states. Additional components can be provided, but are not required. An example of a suitable actuator 18 is shown in FIGS. 6–7.

FIG. 1 illustrates a film unit 10 in which a function is directly disabled or enabled by the latch 16. The film unit 10 has a memory element 42 that stores or can store digital information. The memory element has an access right that is controlled by the state of the latch 16. The access right controls a predetermined viewing, modification, or other usage of information stored within the memory element 42. For example, in the unset state 38 (shown in solid lines in FIGS. 1), the memory element is writable and readable. In the set state 40 (shown in dashed lines in FIG. 1), the memory element 42 is readable, but not writable. Multiple latches can be provided to independently control multiple access rights. For example, the memory element can multiple, separately accessible logical or physical partitions.

The memory element 42 and filmstrip 14 remain physically associated at all times prior to film development and, it is preferred, remain physically associated at all times after film development. In the embodiment of the film unit 10 shown in FIG. 1, the support 12 is configured so as to retain the filmstrip 14 with the memory element 42 in the same manner that the filmstrip is customarily retained with the cartridge in Advanced Photo System™ film. One end of the filmstrip (not shown) is attached to a spool within a canister prior to film development. At film development, the filmstrip is detached, processed, and returned to the same canister.

Figure 2:
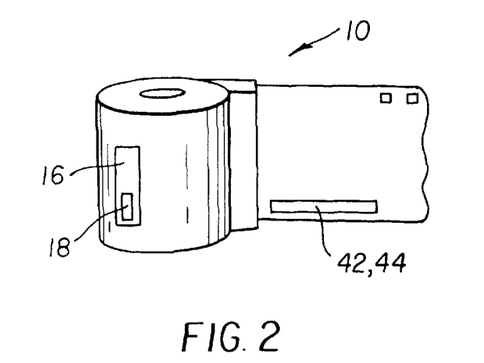
FIG. 2 is a perspective view of another embodiment of the latched film unit.
Figure 3:
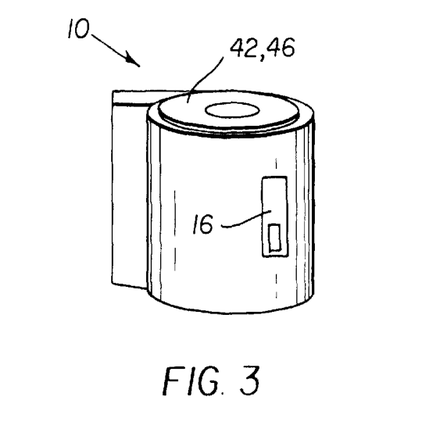
FIG. 3 is a perspective view of another embodiment of the latched film unit.
Figure 4:
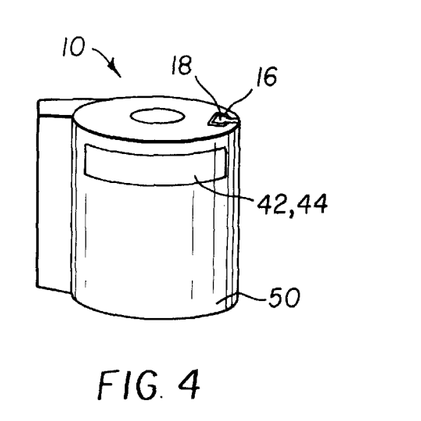
FIG. 4 is a perspective view of another embodiment of the latched film unit.

The memory element 42 can have a variety of forms can use any of a variety of different kinds of media and can be in different locations in the film unit 10. For example, the media can be magnetically recordable media, or a semiconductor memory unit, or an optical memory unit. Also for example, the memory element 42 can be a magnetically recordable layer 44 joined to the photographic filmstrip 10, as shown in FIG. 2, an semiconductor memory module 46 attached to the cassette, as shown in FIG. 3, an area of magnetically recorded media 48 deposited on the cassette shell 50 or on a component of the cassette, as shown in FIGS. 4–5.

The storage capacity of the memory element is not critical. Magnetic storage in the memory element is limited in capacity, because of space constraints. Semiconductor memory chips suitable for use in the memory element of the film unit have large capacities, but may be high in cost. Optical memory varies in capacity by technology.

The memory element has media that is readable and writable by an active component. The memory element can include the active component that writes and reads the memory or the active component can be provided by an appropriately configured camera or other device. For example, a memory element having an semiconductor memory unit can include a microprocessor as part of the memory element, or a microprocessor can be provided as a part of a camera or other device configured to receive the film unit, or both. Similarly, a memory element can have a magnetically recordable media that is located so as to be accessed by a read-write head provided in a camera or other device; or the film unit can include the read-write head.

Figure 9:
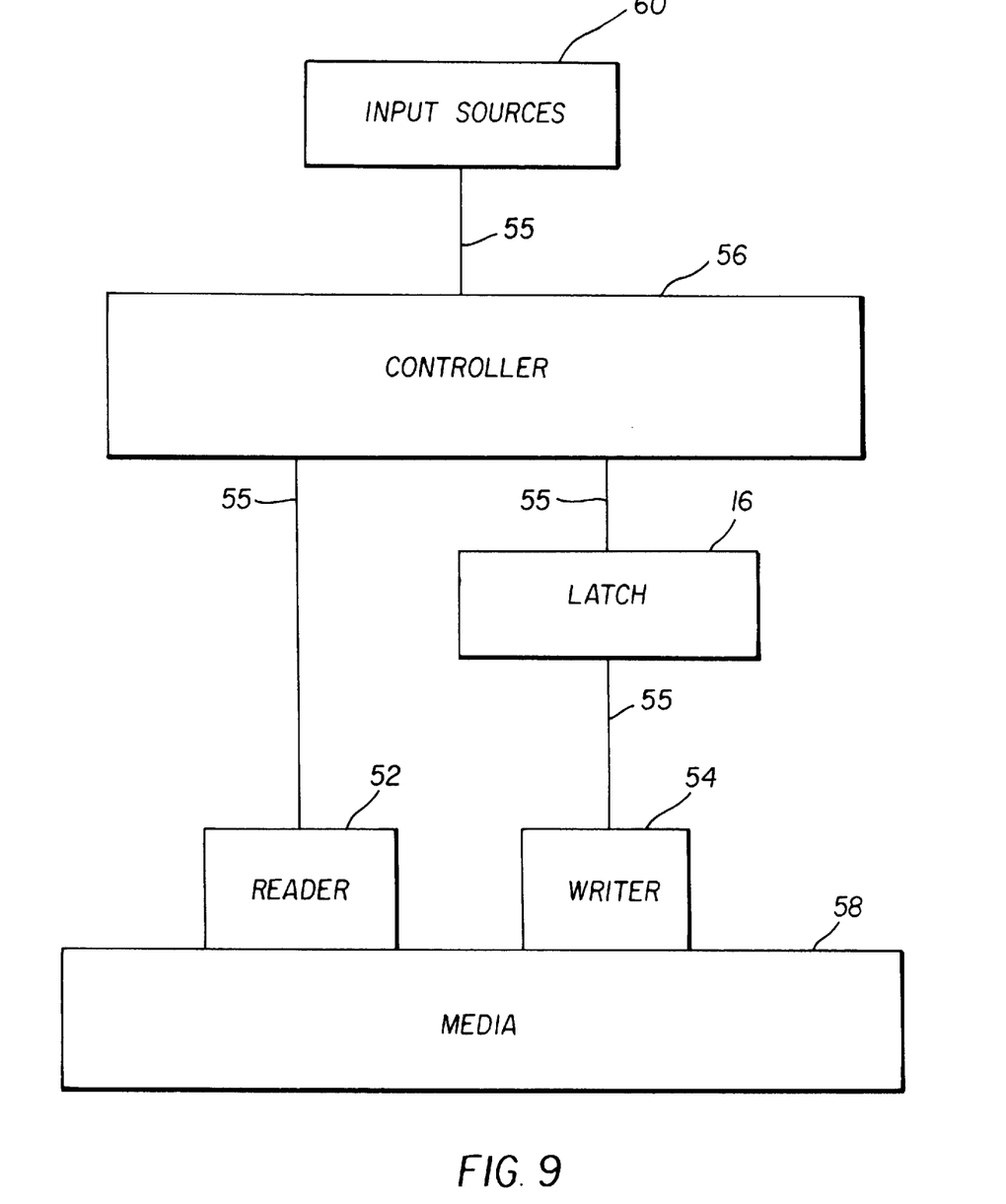
FIG. 9 is a diagrammatical view of the active component and memory element of the latched film units and latching devices.

FIG. 9 illustrates the an active component and memory element. The active component can have a separate reader 52 and writer 54, as shown in FIG. 9, or these functions can be provided by the same component. In use, the active component, or separate reader and writer are operatively connected (illustrated in FIG. 9 by paths 55) to a controller 56 that causes information to be written to or read from the media 58 responsive to input sources 60. The latch 16 is physically or logically interposed between the controller 56 and writer 54. The state of the latch 16 controls writing to the memory element. The control is either direct by disabling a write function of the active component or indirect by acting as a flag that causes a signal to be sent to a controller 56 that causes the controller 56 to not transmit writing signals to the writer 54.

In the film unit 10 of FIG. 1, the latch 16 is a bistable electrical switch that is wired, by a pair of conductors 62, to an integrated circuit module 64 that includes random access memory as the media of the memory element. The memory element includes a standby battery or other features to render the random access memory non-volatile. The latch 16 has an actuator 18 that moves between the unset state 38, shown in solid lines, and the set state 40, shown in dashed lines, to allow or disallow information to be written to the random access memory. Details of the circuitry used are not critical. For example, the actuator 18 can provide an open circuit in the unset state 38 and a closed circuit in the set state 40, or vice versa, depending upon the circuit used in the integrated circuit module 64. Suitable circuits are known to those of skill in the art.

FIGS. 6–7 illustrate another film unit 10 in which a pair of latches 16 are provided. Part of the memory element 42 is shown on the side of the cartridge. In FIG. 6, both latches 16 are in the unset state. In FIG. 7, a first latch 16a is in the unset state 38 and the second latch 16b is in the set state 40. The actuator 18 is pivoted or bent in moving between the unset 38 and set states 40. In the unset state 38, a first end 66 of the actuator 18 is aligned with the exterior surface 68 of the support 12. In the set state 40, the first end 66 is deflected inward from the exterior surface of the support 12. It is preferred that the first end 66 of the actuator 18 is recessed into the support 12 so that the surface of the first end 66 is flush with or inset from the exterior surface 68 of the support 12. This reduces the risk of unintended actuation by the user.

Additional states can optionally be provided for additional functions. For example, the actuator could be switchable to a third state, in which the memory element is neither writable nor readable. Two state latches are preferred, for simplicity and to reduce the risk of misplacement. If additional functions are needed, then it is preferred that multiple two-state latches be used.

The state of the latch or latches can be changed at any time the film unit is accessible for manual switching or accessible to a latching mechanism. It is highly preferred that the filmstrip in the film unit is independent of the state of the latch or latches on the film unit; that is, that the state of the latches does not control the exposure of images on the filmstrip. The latch or latches on the film unit can thus be set at any time before, after, or during film exposure. There are many different system available that allow a user to control film exposure in a camera. The latched film unit can be used for this purpose, but is more advantageously used to control a process downstream from film exposure. For example, a latch can be used to write protect information captured at the time of film exposure, from being overwritten during photofinishing or other usage of the film unit. Similarly, photofinishing information can be protected from being overwritten during later usage of the film unit.

Figure 11:
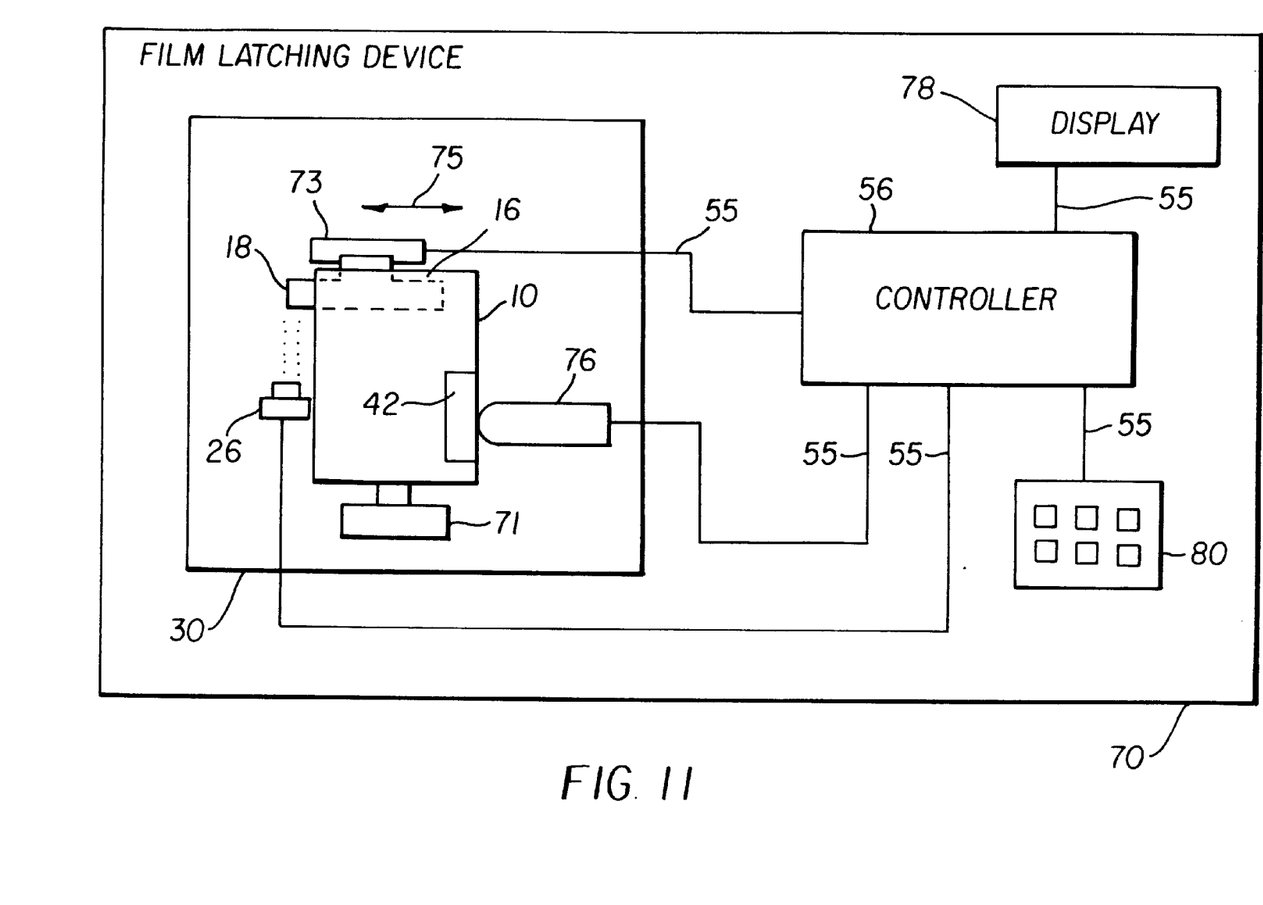
FIG. 11 is a diagrammatical view of another embodiment of the latching device. A latched film unit is present in cassette station.

Referring to FIG. 11, the system of the invention includes the latching film unit 10 and a film latching device 70. The film latching device 70 has a cassette station 30 that receives the latched film unit 10. If the film latching device 30 is a camera, the cassette station 30 light-tightly encloses the film unit 10 in the same manner as the cassette chamber in other cameras. The device has a film transport 71 that engages the film unit 10 and can transport the filmstrip relative to the shell of the film unit and other film related components (not shown). The nature of the other components depends upon the functions of the device. For example, a device that is a camera also includes a capture system, as in other cameras. The device has a latching mechanism 26 having one or more effectors 73 that can be actuated (indicated by double-headed arrow 75) to switch the latch 16 and a detector 26 that determines if the latch 16 is in the unset state 38 or in the set state 40. The detector 26 signals a controller 56, which has been preset to change an operator from one state to another responsive to the detector signal. Signal paths 55 are shown as lines. The type of detector used varies with latch configuration. Mechanical and optical detectors are currently preferred. Suitable controllers, detectors, and effectors are well known to those of skill in the art. The controller 56 can have a microprocessor which uses the signal from the detector 26 as a logical flag. The device shown in FIG. 11 has an effector 73, a detector 26 that signals the state of the latch 16, a read-write actuator 76 that writes to the memory element 42 of the film unit 10 , a display 78, a user interface (shown as a keypad 80), and a controller 56 connected to the other items by signal paths 55.

Figure 12:
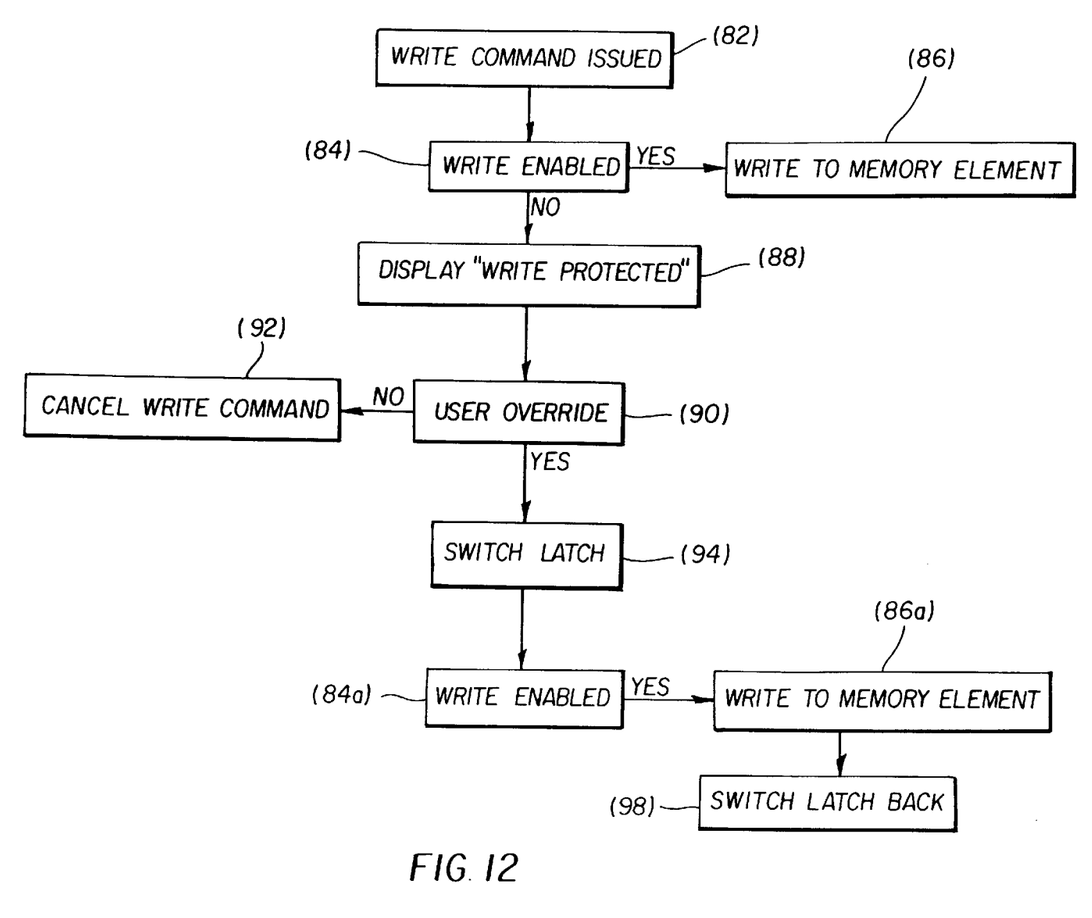
FIG. 12 is a diagram of the procedure for use of the latching device of FIG. 11.

A mode of operation of the device is illustrated in FIG. 12. A write command is issued (82), by the user or automatically by the device. The controller determines (84) whether the detector indicates that the memory unit is write enabled. If the memory unit is write enabled, then information is written (86) to the memory element. If the memory unit is not write enabled, then a message "Write Protected" is displayed (88) to the user. The user can then choose (90) whether to override the latch as to the write command. If the user does not choose to override, then the write command is cancelled (92). If the user chooses to override, then the latch is switched (94) by a detector and the detector indicates (84a) that the memory unit is write enabled. The information is then written (86a) to the memory element and the latch is then returned (98) to the initial, write disabled state.

The invention has been described in detail with particular reference to certain preferred embodiments thereof, but it will be understood that variations and modifications can be effected within the spirit and scope of the invention.

What is claimed is:

1. A latched film unit comprising:
   a light-tight support,
   a photographic filmstrip held by said support, said filmstrip being movable relative to said support for exposure of a plurality of images;
   a latch mounted to said support, said latch being manually and reversibly switchable, independent of said exposure, between a first state and a second state.

2. The film unit of claim 1 wherein said latch is mounted such that each said state of said latch is visually discernable external to said support.

3. The film unit claim 1 wherein said latch in said support.

4. A latched film unit comprising:
   a support,
   a filmstrip held by said support;
   a plurality of the latches mounted to said support, said latches each being independently switchable from a first state to a second state, at any time.

5. The film of claim 4 wherein said latches are each reversibly switchable between said first state said second state.

6. The film unit of claim 5 wherein said latches are each manually switchable between said first state and said second state.

7. The film unit of claim 4 wherein said latches are each manually switchable from said first state to said second state.

8. A latched film unit comprising:
   a light-tight support,
   a photographic filmstrip held by said support, said filmstrip being movable relative to said support for exposure of a plurality of images;
   an latch mounted to said support, said latch being switchable, at all times and independent of said exposure, from a first state to a second state; and
   a memory element associated with said filmstrip, said memory being writable and readable when said latch is in said first state, said memory element being only readable when said latch is in said second state.

9. The film unit of claim 8 wherein said latch is reversibly switchable between said first state and said second state.

10. The film unit of claim 9 wherein said latch is manually switchable between said first state and said second state.

11. The film unit of claim 8 wherein said latch is manually switchable from said first state to said second state.

12. The film unit of claim 8 wherein each said state of said latch is visually discernable at said latch.

13. The film unit of claim 8 wherein said memory element includes a semiconductor memory element.

14. The film unit of claim 8 wherein said memory is joined to said strip of photographic material.

15. The film unit of claim 8 wherein said latch is manually and reversibly switchable.

16. The film unit of claim 15 wherein each said state of said latch is visually discernable at said latch.

17. The film unit of claim 8 wherein said memory element is a magnetically recordable layer joined to said filmstrip.

18. A latched film unit comprising:
   a support,
   a filmstrip held by said support;
   a memory element held by said support, said memory element having different first and second access rights, said access rights each, independently, having a plurality of conditions;
   first and second latches mounted to said support, said latches each being independently switchable between a plurality of different states, each said state corresponding to one of said conditions of a respective said access right.

19. The film unit of claim 18 wherein said memory element has first and second memory element portions, and each said access right has a granted condition and a denied condition and said latch each have a unset state corresponding to said granted condition and a set state corresponding to said denied condition of the respective said access right.

20. The film unit of claim 18 wherein said latches are each reversibly switchable between respective said unset and set states.

21. The film unit of claim 18 wherein said latches are mechanical.

22. A latched film unit comprising:

a support, a filmstrip disposed within said support;

a memory element held by said support, said memory element having a plurality of memory element portions, said memory element portions each being independently writable and readable;

a plurality of latches mounted to said support, each said latch being independently switchable between an unset state and a set state, each said latch in said unset state allowing writing of a respective one of said memory element portions, each said latch in said set state blocking writing of said respective one of said memory element portions.

23. Film unit latching device for use with a latched film unit having photographic film and a latch reversibly switchable between a first state and a second state, said device comprising:

a cassette station receiving the cassette;

a film transport disposed in operative relation to said cassette station to move said film relative to said cassette station;

a set probe disposed in operative relation to said cassette station, said set probe being selectively actuable to switch said latch from said first state to said second state; and an unset probe selectively actuable to switch said latch from said set state to said unset state.

24. The film unit latching device of claim 23 wherein said probes are each selectively actuable to mechanically switch said latch.

25. The film unit latching device of claim 23 wherein said film unit has a read-write memory element, said latch is switchable from said first state to said second state to disable writing to said memory element, and said device further comprises a controller having a connector disposed in operative relation to said cassette station for signal transmission to and from said memory element.

26. The film unit latching device of claim 23 wherein said cassette station light-tightly receives said cassette.

27. The film unit latching device of claim 23 wherein said latch has at least one additional latch and said device further comprises at least one additional probe disposed in operative relation to said cassette station and being selectively and independently actuable to switch said additional latch.

28. A camera comprising a combination of the film unit latching device of claim 23 and a film exposure system disposed in operative relation to said film transport.

29. An image information handling method comprising the steps of:

exposing at least one image on a filmstrip of a film unit;

writing data on a memory element of said film unit; and mechanically switching a reversible write-protect latch of said film unit to write-protect said data.

30. The method of claim 29 wherein said memory element has a plurality of memory element portions, said writing further comprises writing data on one of said memory element portions, and said write protecting further comprises write protecting only said one of said memory element portions.

31. A write access control system comprising:

a film unit including:

a support, a filmstrip disposed in said support;

an latch mounted to said support, said latch being reversibly switchable between an unset state and a set state; and memory element held by said support, said memory element being writable and readable when said latch is in said unset state, said memory element being only readable when said latch is in said set state; and a film unit latching device including:

a cassette station receiving said cassette;

a film transport disposed in operative relation to said cassette station to move said filmstrip relative to said cassette station;

a controller having a connector disposed in operative relation to said cassette station for signal transmission to and from said memory element; and a set probe selectively movable against said latch to switch said latch from said unset state to said set state.

* * * * *

UNITED STATES PATENT AND TRADEMARK OFFICE
CERTIFICATE OF CORRECTION

PATENT NO. : 6,222,999 B1
DATED : April 24, 2001
INVENTOR(S) : Daniel M. Pagano et al It is certified that error appears in the above-identified patent and that said Letters Patent is hereby corrected as shown below:

<u>Column 6,</u>
Claim 3, after "latch" insert -- is recessed --

Signed and Sealed this

First Day of January, 2002

Attest:

Attesting Officer

JAMES E. ROGAN
*Director of the United States Patent and Trademark Office*